United States Patent [19]

Waniczek et al.

[11] Patent Number: 4,602,056
[45] Date of Patent: Jul. 22, 1986

[54] USE OF GRAFTED ETHYLENE-VINYLACETATE COPOLYMERS FOR THE PRODUCTION OF HOTMELT ADHESIVES

[75] Inventors: Helmut Waniczek, Cologne; Gerhard Hohmann, Leverkusen; Herbert Bartl, Odenthal; Ludwig Mott, Leverkusen, all of Fed. Rep. of Germany

[73] Assignee: Bayer Aktiengesellschaft, Leverkusen, Fed. Rep. of Germany

[21] Appl. No.: 733,239

[22] Filed: May 10, 1985

Related U.S. Application Data

[63] Continuation of Ser. No. 579,768, Feb. 13, 1984, abandoned.

[30] Foreign Application Priority Data

Feb. 23, 1983 [DE] Fed. Rep. of Germany ....... 3306202

[51] Int. Cl.[4] .................... C08L 23/08; C08L 31/04; C08L 51/00

[52] U.S. Cl. .................................. 524/272; 524/533; 525/74; 525/75; 525/78; 525/301; 525/285; 525/388; 525/904

[58] Field of Search ............... 525/904, 301, 388, 75; 524/272

[56] References Cited

U.S. PATENT DOCUMENTS

| | | | |
|---|---|---|---|
| 3,211,808 | 10/1965 | Young et al. | 525/904 |
| 3,868,433 | 2/1975 | Bartz et al. | 525/193 |
| 3,949,019 | 4/1976 | Zeitler et al. | 525/301 |
| 3,950,209 | 4/1976 | Kosaka et al. | 525/301 |
| 4,102,946 | 7/1978 | Imura et al. | 525/301 |

FOREIGN PATENT DOCUMENTS

| | | |
|---|---|---|
| 843190 | 8/1960 | United Kingdom . |
| 876535 | 9/1961 | United Kingdom . |
| 963771 | 7/1964 | United Kingdom . |
| 1140116 | 1/1969 | United Kingdom . |

Primary Examiner—Carman J. Seccuro
Attorney, Agent, or Firm—Connolly and Hutz

[57] ABSTRACT

The invention relates to the use of grafted ethylene-vinylacetate copolymers (EVA-copolymers) for the production of hotmelt adhesives.

4 Claims, No Drawings

USE OF GRAFTED ETHYLENE-VINYLACETATE COPOLYMERS FOR THE PRODUCTION OF HOTMELT ADHESIVES

This application is a continuation of application Ser. No. 579,768, filed Feb. 13, 1984, now abandoned.

This invention relates to the use of grafted ethylene-vinylacetate copolymers (EVA copolymers) for the production of hotmelt adhesives.

Many different homopolymers, copolymers and graft copolymers have been proposed as polymers for the production of adhesives. Mixtures thereof with natural or synthetic resins and waxes are suitable for hotmelt adhesives. It is also known that certain ethylene-vinylacetate copolymers are suitable for the production of hotmelt adhesives of the type used for glueing wood or paper.

However, advances in mechanization are imposing increasingly more stringent demands upon the adhesion properties of adhesives, with the result that adhesion to a variety of different substrates, for example to metals, is of considerable interest. In this connection, it would be desirable to combine the advantages of a hotmelt adhesive, for example absence of solvents, quick setting and simple application, with firm adhesion to metals.

To this end, it has already been proposed to introduce acid groups into ethylene-vinylacetate copolymers through the incorporation by polymerization of acrylic acid, maleic acid or maleic acid anhydride. However, although some improvement in adhesion to metals is obtained in this way, it is still not entirely satisfactory.

The grafting of monomers containing carboxyl groups onto ethylene-vinylacetate copolymers has also been described.

Thus, DE-OS No. 23 51 155 and DE-OS No. 24 16 614 for example propose graft polymers of carboxyl group-containing monomers on ethylene-vinylacetate copolymers for use in hotmelt adhesives. The graft copolymers are produced using a radical initiator.

It has now been found that ethylene-vinylacetate copolymers, which following the introduction of peroxide groups into the polymer are grafted with polymerizable carboxylic acids, may be used for the production of hotmelt adhesives.

Accordingly, the present invention relates to the use of graft copolymers composed of 90 to 99.5% by weight of a graft base, consisting of a copolymer of 50 to 85% by weight of ethylene units and 15 to 50% by weight of vinylacetate units together with optionally 0 to 10% by weight of units of other unsaturated compounds and of 0.5 to 10% by weight of monomer units grafted on by the process according to DE-OS No. 27 34 105 and consisting of 80 to 100% by weight of methacrylic acid units and optionally of 0 to 20% by weight of units of other unsaturated monomers, for the production of hotmelt adhesives.

The graft copolymers used in accordance with the invention are composed of 90 to 99.5% by weight of a graft base, consisting of a copolymer of 50 to 85% by weight of ethylene units, preferably 55 to 80% by weight of ethylene units, and of 15 to 50% by weight of vinyl-acetate units, preferably 20 to 45% by weight of vinyl-acetate units, together with 0 to 10% by weight of units of other unsaturated compounds, and of 0.5 to 10% by weight of grafted-on monomer units consisting of 80 to 100% by weight of methacrylic acid units and 0 to 20% by weight of units of other unsaturated monomers, grafting being carried out by the process according to DE-OS No. 27 34 105.

Graft copolymers of the type obtained by graft polymerization of the unsaturated acids in the conventional monomer in the presence of the graft substrate and a radical former do not show these favourable properties when used for the production of hotmelt adhesives.

In the graft polymers used in accordance with the invention, the peroxide groups in the graft substrate are introduced by perioxygenation in the melt using the process according to DE-OS No. 27 34 105, the reaction being carried out either in a reaction screw or in kneaders.

The ethylene-vinylacetate copolymers used should contain from 15 to 50 % by weight of vinylacetate units and ethylene-vinylacetate copolymers containing from 20 to 45% by weight of vinylacetate units are preferred.

In addition to vinylacetate and ethylene, the graft substrate may also contain up to 10% by weight of other unsaturated compounds, for example acrylic acid or acrylates, methacrylates or other copolymerizable unsaturated compounds in copolymerized form.

Ethylene-vinylacetate copolymers are preferably used as the graft substrate.

Ethylene-vinylacetate copolymers having a melt index of from 0.5 to 1000 g/10 mins (as measured in accordance with DIN 53 735 at 190° C. under a load of 2.16 kg) are preferably used for producing the graft copolymers used in accordance with the invention. Ethylenevinylacetate copolymers having melt indices of from 1 to 500 g/10 mins (as measured in accordance with DIN 53 735 at 190° C. under a load of 2.16 kg) are preferably used.

The graft polymers used in accordance with the invention are produced by the grafting process described in DE-OS No. 27 34 105. If, for example, the ethylene-vinylacetate copolymers used are peroxygenated with atmospheric oxygen under pressure in the melt, products containing from 50 to 3000 ppm of active oxygen are obtained. During this reaction, the graft base may even undergo oxidative degradation. This can be advantageous because the melt index of the graft copolymer and the application properties of the hotmelt adhesive are favourably influenced in this way. The peroxide-containing polymers thus obtained are then used in the same process step for polymerizing the graft monomers. In this way, a large number of grafted-on side chains are introduced into the graft substrate.

From 80 to 100% by weight of the grafted-on monomer units consist of methacrylic acid. They may contain from 0 to 20% by weight of other unsaturated compounds, for example butylacrylates and styrene.

The adhesives used in accordance with the invention are produced by mixing the ethylene-vinylacetate graft copolymers with tackifying resins, optionally in the presence of, for example, antiagers, light stabilizers, plasticizers, waxes, fillers and pigments.

The tackifying resins used are, for example, modified or unmodified colophony resins, such as rosin, hydrogenated rosin or dimerized rosin or esters thereof with alcohols, such as glycerol or pentaerythritol, hydrocarbon resins, such as coumarone or indene resins, or other resins which tackify the mixture.

Mixing of the components is carried out in known manner in mixers, kneaders or extruders at elevated temperatures, normally at temperatures in the range of from 100° to 250° C. However, the components may also be combined at room temperature and subsequently homogenized by increasing the temperature.

The hotmelt adhesives produced in accordance with the invention are distinguished by their favourable adhesion to metals. They are particularly suitable for metal-to-metal bonding and for bonding metals to other substrates, such as plastics or natural materials. Other materials may of course also be bonded using the adhesives according to the invention.

The formation of bonds of the type in question is known and is carried out, for example, by applying the molten adhesive to the substrate, followed by pressing, or by making a film from the hotmelt adhesive and heating it between the parts to be bonded.

EXAMPLES

Production of the graft polymers

A twin-screw extruder of the type described in DE-OS No. 27 34 105 is used for producing the graft polymers. This extruder is divided up into
1. a feed zone
2. a melting zone
3. a compression zone
4. an induction zone with an inlet for gases under pressure
5. an oxidation zone with an inlet for gases under pressure
6. a compression zone
7. a degassing zone
8. a compression zone
9. a polymerisation zone with a inlet for monomers
10. a compression zone
11. an evaporation zone
12. an extrusion zone.

The twin-screw extruder (type ZSK) has a screw length to screw diameter ratio of 50.

The quantities and temperatures indicated in the following Examples and other process parameters relate to this extruder.

EXAMPLE 1

An ethylene-vinylacetate copolymer consisting of 33% by weight of vinylacetate units and 67% by weight of ethylene units (melt index 20 g/10 mins as determined in accordance with DIN 53 735 at 190° C. under a load of 2.16 kg) was continuously metered into the feed zone of the extruder (as just described) of the twin-screw type having a screw diameter of 32 mm (for the reaction conditions, see Table 1).

Products having the following data obtained:

| Example No. | $Mi_{2.16}^{190}$ [g/10 mins] | Monomer grafted on (methacrylic acid [% by weight] based on total weight |
|---|---|---|
| 1a | 29.3 | 2.31 |
| 1b | 24.6 | 4.13 |
| 1c | 22.0 | 6.78 |

$Mi_{2.16}^{190}$ = melt index in g/10 mins as determined in accordance with DIN 53 735 at 190° C. under a load of 2.16 kg.

EXAMPLE 2

An ethylene-vinylacetate copolymer consisting of 45% by weight of vinylacetate units and 55% by weight of ethylene units (melt index 3 g/10 mins as determined in accordance with DIN 53 735 at 190° C. under a load of 2.16 kg) was introduced into the feed zone of the extruder (for the reaction conditions, see Table 1).

Products having the following data were obtained:

| Example No. | $Mi_{2.16}^{190}$ [g/10 mins] | Monomer grafted on (methacrylic acid) [% by weight] based on total quantity |
|---|---|---|
| 2a | 13.6 | 2.16 |
| 2b | 12.8 | 4.4 |
| 2c | 11.6 | 7.5 |
| 2d | 5.5 | 9.18 |

EXAMPLE 3

An ethylene-vinylacetate copolymer consisting of 28% by weight of vinylacetate units and 72% by weight of ethylene units (melt index 400 g/10 mins, as determined in accordance with DIN 53 735 at 190° C. and under a load of 2.16 kg) was grafted by the same process (for reaction conditions, see Table 1).

The graft copolymers obtained have the following data:

| Example No. | $Mi_{2.16}^{190}$ [g/10 mins] | Monomer grafted on (methacrylic acid) [% by weight], based on total quantity |
|---|---|---|
| 3 | cannot be measured | 1.54 |

EXAMPLE 4

An ethylene-vinylacetate copolymer was introduced as described in Example 2 into the feed zone of the extruder (for reaction conditions, see Table 1). A mixture of 90% by weight of methacrylic acid and 10% by weight of styrene was used as the monomer.

The graft copolymers obtained have the following data:

| Example No. | $Mi_{2.16}^{190}$ [g/10 mins] | Monomer grafted on [% by weight] based on total weight |
|---|---|---|
| 4a | 9.4 | 2.36 methacrylic acid + 0.2 styrene |
| 4b | 8.4 | 4.1 methacrylic acid + 0.4 styrene |
| 4c | 6.0 | 7.0 methacrylic acid + 0.65 styrene |

EXAMPLE 5

The starting material was an EVA-copolymer of the type used in Example 1. The monomer used was a mixture of 90% by weight of methacrylic acid and 10% by weight of styrene.

The graft copolymers obtained have the following data:

| Example No. | $Mi_{2.16}^{190}$ [g/10 mins] | Monomer grafted on [% by weight], based on total weight |
|---|---|---|
| 5a | 30.1 | 1.73 methacrylic acid + 0.2 styrene |
| 5b | 24.7 | 3.37 methacrylic acid + 0.35 styrene |
| 5c | 21.1 | 5.67 methacrylic acid + 0.55 styrene |

EXAMPLE 6

An EVA-copolymer of the type used in Example 1 was processed under the reaction conditions set out in Table 1. The graft copolymers obtained have the following data:

| Example No. | $Mi_{2.16}^{190}$ [g/10 mins] | Monomer grafted on [% by weight], based on total weight |
|---|---|---|
| 6a | 60.9 | 1.39 methacrylic acid + 0.34 n-butyl-acrylate |
| 6b | 60.2 | 2.88 methacrylic acid + 0.76 n-butyl-acrylate |
| 6c | 44.9 | 3.74 methacrylic acid + 0.95 n-butyl-acrylate |

EXAMPLE 7

An EVA-copolymer of the type used in Example 2 was processed under the reaction conditions set out in Table 1. The graft copolymers obtained have the following data:

| Example No. | $Mi_{2.16}^{190}$ [g/10 mins] | Monomer grafted on [% by weight] based on total weight |
|---|---|---|
| 7a | 13.6 | 1.77 methacrylic acid + 0.31 n-butyl-acrylate |
| 7b | 14.9 | 3.84 methacrylic acid + 0.72 n-butyl-acrylate |
| 7c | 9.6 | 5.28 methacrylic acid + 1.05 n-butyl-acrylate | ethylene-vinylacetate copolymers, were produced and tested in the same way. The results obtained are set out in Table 3.

TABLE 2

Hotmelt adhesives used
All the hotmelt adhesives contain 75 parts by weight of glycerol ester of hydrogenated rosin and 1 part by weight of 2,2'-methylene-bis-(4-methyl-6-tert.-butylphenol) as antiager.

| Hotmelt adhesive | Graft polymers according to Example No. |
|---|---|
| A | 1a |
| B | 1b |
| C | 1c |
| D | 2a |
| E | 2b |
| F | 2c |
| G | 2d |
| H | 3 |
| I | 4a |
| K | 4b |
| L | 4c |
| M | 5a |
| N | 5b |
| O | 5c |
| P | 6a |
| Q | 6b |
| R | 6c |
| S | 7a |
| T | 7b |
| U | 7c |
| V | 1 |
| W | 2 |
| X | 3 |
| Y | 4 |

TABLE 1

Production of the hotmelt adhesives

| Example | EVA [g/n] | Screw speed [Upm] | Monomer [l/h] | Quantity of air in zone 4 [l/h] | Quantity of air in zone 5 [l/h] | Temperatures in zone [°C.] 1 | 2 | 3 | 4 | 5 | 6 | 7 | 8 | 9 | 10 | 11 | 12 |
|---|---|---|---|---|---|---|---|---|---|---|---|---|---|---|---|---|---|
| 2a | 6500 | 100 | 480 | 340 | 330 | 72 | 100 | 144 | 190 | 220 | 200 | 167 | 158 | 160 | 152 | 190 | 190 |
| 2b | 6500 | 100 | 720 | 340 | 330 | 72 | 100 | 145 | 190 | 218 | 200 | 170 | 157 | 156 | 147 | 190 | 195 |
| 2c | 6500 | 100 | 1200 | 340 | 330 | 70 | 100 | 144 | 190 | 220 | 200 | 170 | 160 | 160 | 150 | 185 | 195 |
| 2d | 6500 | 100 | 1500 | 340 | 330 | 70 | 100 | 145 | 190 | 218 | 200 | 170 | 160 | 160 | 150 | 185 | 195 |
| 1a | 6500 | 100 | 480 | 340 | 330 | 75 | 100 | 139 | 195 | 210 | 200 | 153 | 154 | 150 | 150 | 180 | 195 |
| 1b | 6500 | 100 | 780 | 340 | 330 | 76 | 100 | 139 | 195 | 212 | 200 | 158 | 154 | 147 | 151 | 177 | 194 |
| 1c | 6500 | 100 | 1500 | 340 | 330 | 76 | 100 | 139 | 195 | 212 | 200 | 158 | 154 | 147 | 151 | 178 | 195 |
| 3 | 6500 | 130 | 900 | 340 | 330 | 63 | 85 | 100 | 182 | 173 | 160 | 134 | 150 | 156 | 158 | 172 | 150 |
| 4a | 6500 | 100 | 480 | 340 | 330 | 68 | 108 | 140 | 210 | 209 | 175 | 155 | 156 | 140 | 145 | 185 | 190 |
| 4b | 6500 | 100 | 780 | 340 | 330 | 67 | 110 | 140 | 211 | 209 | 175 | 155 | 156 | 141 | 145 | 185 | 190 |
| 4c | 6500 | 100 | 1500 | 340 | 330 | 67 | 110 | 140 | 211 | 208 | 175 | 156 | 156 | 141 | 145 | 185 | 190 |
| 5a | 6500 | 100 | 480 | 340 | 330 | 90 | 120 | 150 | 220 | 208 | 168 | 160 | 156 | 148 | 155 | 195 | 195 |
| 5b | 6500 | 100 | 780 | 340 | 330 | 90 | 125 | 150 | 222 | 208 | 168 | 160 | 156 | 148 | 157 | 195 | 195 |
| 5c | 6500 | 100 | 1500 | 340 | 330 | 90 | 125 | 150 | 222 | 210 | 168 | 160 | 156 | 150 | 157 | 195 | 195 |
| 6a | 6300 | 100 | 480 | 420 | 360 | 90 | 120 | 150 | 220 | 208 | 168 | 160 | 156 | 148 | 155 | 195 | 195 |
| 6b | 6300 | 100 | 7800 | 420 | 360 | 90 | 125 | 150 | 222 | 208 | 168 | 160 | 156 | 148 | 157 | 195 | 195 |
| 6c | 6300 | 100 | 1500 | 420 | 360 | 90 | 125 | 150 | 222 | 210 | 168 | 160 | 156 | 150 | 157 | 195 | 195 |
| 7a | 6500 | 100 | 480 | 420 | 360 | 90 | 120 | 150 | 220 | 208 | 168 | 160 | 156 | 148 | 157 | 195 | 195 |
| 7b | 6500 | 100 | 780 | 420 | 360 | 90 | 125 | 150 | 222 | 208 | 168 | 160 | 156 | 148 | 157 | 195 | 195 |
| 7c | 6500 | 100 | 1500 | 420 | 360 | 90 | 125 | 150 | 222 | 210 | 168 | 160 | 156 | 150 | 157 | 195 | 195 |

The hotmelt adhesives A-U in Table 2 were produced from the graft polymers prepared in accordance with Examples 1 to 7.

The hotmelt adhesives were produced by initially melting the modified rosin at 180° C. in a melting vessel and subsequently incorporating the graft polymers and the antiager. The resulting melt was then homogenized while stirring.

The melt obtained was knife-coated at 180° C. onto a steel plate in a width of 15 mm, a length of 150 mm, and a thickness of 0.2 mm. A cotton fabric was then applied and the bond subjected to a pressure of 0.3 MPa at 180° C.

After standing for 1 hour at 23° C., the peeling strength of the bonds obtained was determined at 23° C. in accordance with DIN 40 633. The results obtained are set out in Table 3.

The comparison hotmelt adhesives V-Y, which contain ethylene-vinylacetate-acrylic acid copolymers and (1) An ethylene-vinylacetate-acrylic acid copolymer containing 33% by weight of vinylacetate, 64% by weight of ethylene and 3% by weight of acrylic acid (melt index 60 as determined in accordance with DIN 53 735 at 190° C./2.16 kg).
(2) An ethylene vinylacetate-acrylic acid copolymer containing 25% by weight of vinylacetate, 72% by weight of ethylene and 3% by weight of acrylic acid (melt index 150, as determined in accordance with DIN 53 735 at 190° C./2.16 kg).
(3) An ethylene-vinylacetate copolymer containing 33% by weight of vinylacetate and 67% by weight of ethylene (melt index 25, as determined in accordance with DIN 53 735 at 190° C./2.16 kg).
(4) An ethylene-vinylacetate copolymer containing 45% by weight of vinylacetate and 55% by weight of ethylene (melt index 2.5, as determined in accordance with DIN 53 735 at 190° C./2.16 kg).
(5) Glycerol ester of hydrogenated rosin.
(6) 2,2'-methylene-bis-(4-methyl-6-tert.-butylphenol).

TABLE 3

| Hotmelt adhesive | Peel strength (N/mm) as determined at 23° C. in accordance with DIN 40 632 |
| --- | --- |
| A | 7.9 |
| B | 9.7 |
| C | 12.0 |
| D | 5.1 |
| E | 7.0 |
| F | 7.8 |
| G | 9.1 |
| H | 7.6 |
| I | 8.1 |
| K | 6.6 |
| L | 7.2 |
| M | 5.1 |
| N | 7.4 |
| O | 7.8 |
| P | 10.4 |
| Q | 9.6 |
| R | 8.3 |
| S | 5.7 |
| T | 5.6 |
| U | 7.4 |
| V | 8.2 |
| W | 9.8 |
| X | 5.1 |
| Y | 4.7 |

We claim:

1. Hot melt adhesvie comprising a graft copolymer mixed with a tackifying resin wherein the graft copolymer is obtained by grafting 0.5 to 10% by weight of monomer units which consist of 80 to 100% by weight of methacrylic acid units onto 90 to 99.5% by weight of a graft base comprising a copolymer of 50 to 85% by weight of ethylene units and 15 to 50% by weight of vinyl acetate units and having been peroxygenated with atmospheric oxygen under pressure in the melt to a level of 50 to 3,000 ppm of active oxygen.

2. Hot melt adhesive comprising a graft copolymer mixed with a tackifying resin which is a modified or unmodified colophony resin or a hydrocarbon resin wherein the graft copolymer is obtained by grafting 0.5 to 10% by weight of monomer units which consist of 80 to 100% by weight of methacrylic acid units onto 90 to 99.5% by weight of a graft base comprising a copolymer of 50 to 85% by weight of ethylene units and 15 to 50% by weight of vinyl acetate units and having been peroxygenated with atmospheric oxygen under pressure in the melt to a level of 50 to 3,000 ppm of active oxygen.

3. Hot melt adhesive according to claim 1 wherein the tackifying resin is a modified colophony resin.

4. Hot melt adhesive according to claim 1 wherein the tackifying resin is the glycerol ester of hydrogenated rosin.

* * * * *